May 6, 1969     B. F. KALINA     3,442,472
ELEVATOR AND RUDDER CONTROL APPARATUS
Filed March 13, 1967     Sheet _1_ of 2
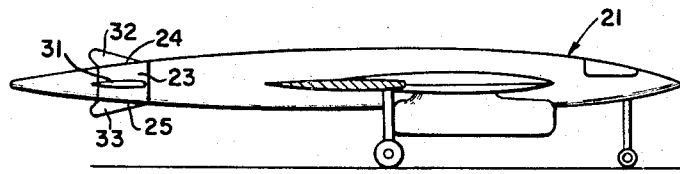
FIG.1.
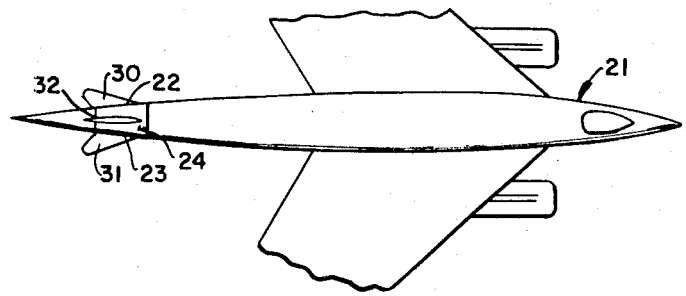
FIG.2.
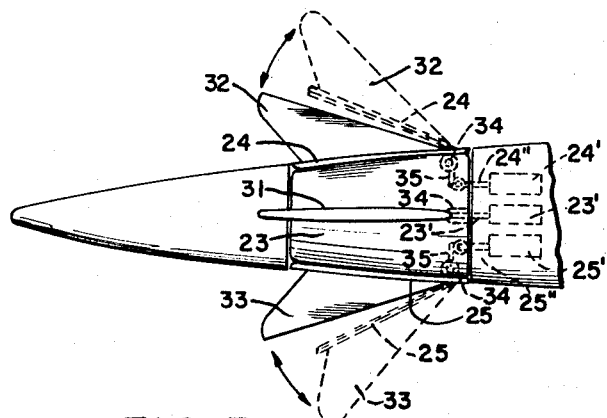
FIG.3.
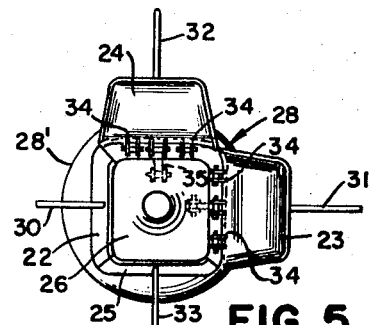
FIG.5.
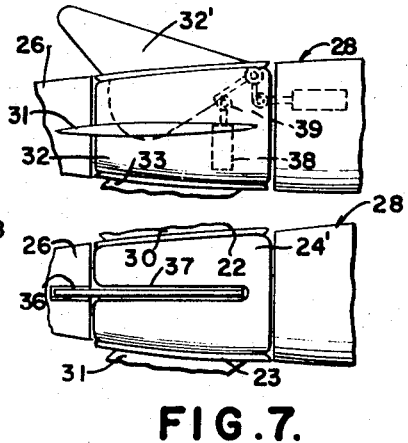
FIG.6.
FIG.7.
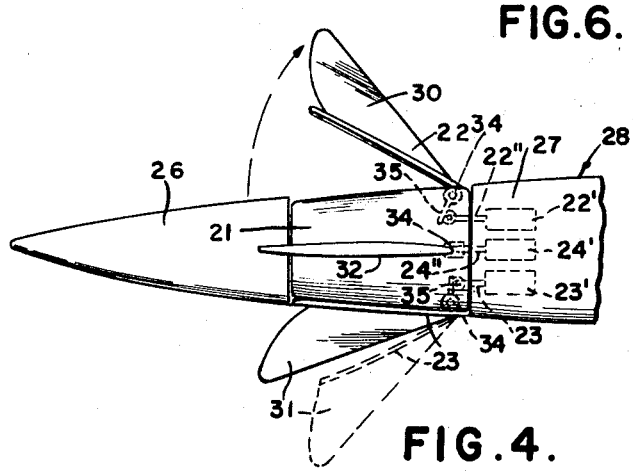
FIG.4.
INVENTOR
Ben F. Kalina
BY *Robert E. Kleve*
ATTORNEY INVENTOR
Ben F. Kalina BY  *Robert E. Kleve*

ATTORNEY

United States Patent Office 3,442,472
Patented May 6, 1969

3,442,472
ELEVATOR AND RUDDER CONTROL
APPARATUS
Ben F. Kalina, Bowman, N. Dak. 58623
Filed Mar. 13, 1967, Ser. No. 622,575
Int. Cl. B64c 9/00
U.S. Cl. 244—87                                    3 Claims

ABSTRACT OF THE DISCLOSURE

The invention comprises an elevator and rudder control device for aircraft comprising a top and bottom panel and opposing side panels, said panels being mounted in 90 degree relation to one another about the tail of an aircraft, said panels being pivotally mounted to said fuselage, and when closed conforming at least generally to the contour of the aircraft and adapted to be individually opened about their pivotal mounting to change the direction of flight of an aircraft with stabilizing fins mounted to the rear of the fuselage.

This invention relates to directional control apparatus, more particularly, the invention relates to elevator and rudder control apparatus for aircraft.

It is an object of the invention to provide a novel elevator and rudder control and aircraft stabilizing invention which will effectively control the direction of flight of an aircraft.

It is a further object of the invention to provide a directional control for craft which creates only a minimum of resistance or drag.

It is a further object of the invention to provide a novel directional control for an aircraft having flaps which when closed at least generally conform to the contour of adjacent areas of the fuselage to create only a minimum of air resistance and when opened act to change the direction of flight of an aircraft.

Further objects and advantages of the invention will become apparent as the description proceeds and when taken in conjunction in accompanying drawing wherein:

FIGURE 1 is a side elevational view of the elevator and rudder control invention shown installed in the tail of an aircraft.

FIGURE 2 is a top plan view of the elevator and rudder control invention installed in the tail of an aircraft.

FIGURE 3 is an enlarged side elevational view of the elevator and rudder control invention with the rudder flaps shown in different positions.

FIGURE 4 is an enlarged top plan view of the elevator and rudder control invention with the elevator flaps shown in different positions.

FIGURE 5 is a tail end view of the elevator and rudder control invention with one elevator and one rudder flap shown in open positions.

FIGURE 6 is an enlarged side elevational view of a modified form of the invention.

FIGURE 7 is an enlarged top plan view of the modified form of the invention.

Figure 8:
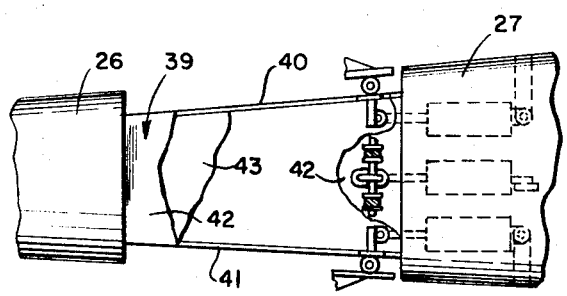
FIGURE 8 is an enlarged side elevational view of the first form of the invention with the flaps and fuselage portions broken away to reveal the interior linkage.
Figure 9:
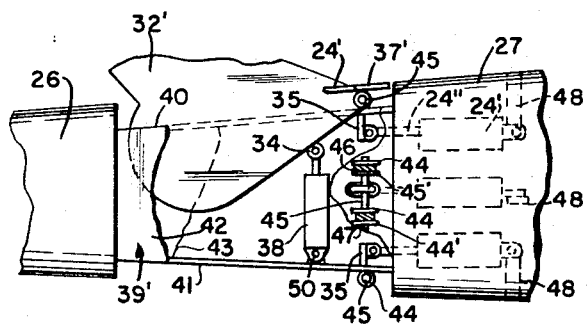
FIGURE 9 is an enlarged side elevational view of the modified form of the invention with portions broken away to reveal the interior linkage.
Figure 10:
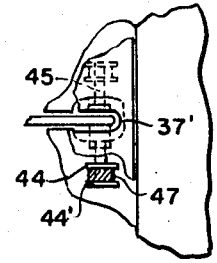
FIGURE 10 is a fragmentary view of the linkage of the adjustable vertical stabilizer fin.
Figures 11, 12:
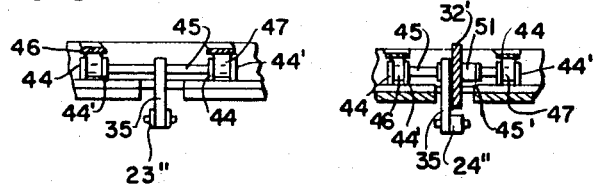
FIGURE 11 is a cross-sectional view taken along line 11—11 of FIGURE 9.
FIGURE 12 is a cross-sectional view taken along line 12—12 of FIGURE 10.

Briefly stated, the invention comprises an elevator and rudder control apparatus mounted to the tail of an aircraft comprising an upper and lower flap mounted to the top and bottom of the tail of an aircraft, the upper flap when opened acting to cause the plane to rise and the lower flap when opened causing the plane to descend. A right and left side flaps, the left side flaps when opened causing the plane to turn to the left and the right side flap when opened causes the plane to turn to the right.

Referring more particularly to the drawing in FIGURE 1 the rudder and elevator directional control invention 20 is shown installed on an airplane 21. The rudder and elevator directional control invention has a pair of side flaps or panels 22 and 23, which cause the plane to turn either to the left or to the right when traveling along a horizontal path. The side panel 22 when opened such as illustrated in dashed lines in FIGURE 3 and designated by the numeral 22' will cause the plane to go to the left, and the side panel 23 when opened such as illustrated in FIGURE 3 in dashed lines and designated by the numeral 23' will cause the plane to turn to the right when following the forward line of travel of the plane illustrated in FIGURE 2.

The top and bottom panels 24 and 25 cause the plane 21 to go either upward or downward. The top panel 24 when opened as shown in FIGURE 4 will cause the plane to go upward and the bottom panel 25 when opened as illustrated in FIGURE 4 in dashed lines will cause the plane to go downward when following the forward line of travel of the plane as illustrated in FIGURE 1.

All of the panels 22, 23, 24, and 25, when closed, generally conform to the contour of the adjacent areas 26 and 27 of the fuselage of the tail 28 of the aircraft 21. The degree to which any one of the panels is opened will vary the amount of change in the direction of the aircraft.

The flaps 22, 23, 24, and 25 have rounded edges and flattened center areas 29. The flattened center areas act to create more effective air deflection and thereby increase the effectiveness of the directional control of the flaps. The flaps, however, may be more rounded to conform to the rounded cross-sectional contour of areas 28' centrally of the length fuselage.

The flaps 22–25 when closed conform generally to the contour of adjacent areas of the fuselage 26 and 28 and thereby create little if any air resistance or drag upon the aircraft.

Each of the flaps 22–25 has stabilizing fins 30, 31, 32, and 33 respectively which are mounted to their respective flap or panel and move in and out with the panel. The stabilizing fins 30–33 tend to keep the airplane on a smooth level path and tend to eliminate any spinning of the aircraft and keep the aircraft moving with the longitudinal axis of the fuselage coaxial with the line of flight of the plane.

The flaps 22–25 are each activated by their respective hydraulic cylinders 22', 23', 24', and 25' which cylinders are controlled and powered by conventional hydraulic pump and control means.

The hydraulic cylinders pivot the panels 22–25 about their pivotal connection 34 to the fuselage. The pistons 22", 23", 24", and 25" of the cylinders being connected to a lever arm 35 fixed to each panel and projecting from the pivotal connection.

When wishing to turn left, airplane panel 22 will be opened and the other panels remain closed, when wishing to turn right the panel 23 will be opened and the other panels left closed. When wishing to cause the plane to rise the panel 24 will be opened and the other left closed or closed and when descent the panel 25 will be opened and the other panels left closed or closed.

The size of the stabilizing fins 30–33 will be independent of the size or requirement panels 22–25 since the fins then do not serve the function of providing a structural support for the elevator and rudder panels and need only be of a size to effectively stabilize the craft.

Thus it will be seen that a novel rudder and elevator directional control and stabilizing apparatus has been provided which will effectively control and change the direction of flight of an aircraft and stabilize the aircraft in flight and which will create only a minimum amount of drag or air resistance.

In the modified form of the invention illustrated in FIGURES 6 and 7, the vertical stabilizer fin 32' is pivotally mounted to the fuselage so that it may be retracted and projected from the tail 28 of the aircraft to give less or more stabilizing fin area for the plane.

The vertical stabilizing fin 32' is mounted and passes out of a slot 36 in the fuselage and a slot 37 in the top panel 24' of the plane. A hydraulic cylinder 38 has its piston pivotally connected to an eye 34 on the stabilizing fin and powers the fin in and out of the fuselage. The side panels 22 and 23 and bottom panel 24 all have the same structure as the panels 22 and 23 and 24 of the first form of the invention illustrated in FIGURES 1–5.

The side panels 22 and 23 and top and bottom panels 24 and 25 have relatively flat central areas 36 to create a more effective directional change of the aircraft in both forms of the invention. However, in both forms of the invention the panels 22–25 may be more rounded to more identically conform to the round cross-sectional contour of the plane.

The fuselage has a tapered box-like interior 39 which joins the adjacent areas 26 and 27 of the fuselage together and the flaps 22–25 surround the box-like interior.

The box-like interior 39 has four sides 40, 41, 42, and 43 which join together to form the box-like interior. Mounted on each of the sides 40–43 are two pair of lugs 44 and 44' which have bores therethrough and a rod 45 passes through the bores. The panels 22–25 each have a pair of lugs 46 and 47 fixed thereto which surround the rod 45 and are fixed to the rod 45 whereby rotation of the rods 45 will pivot the panels.

The hydraulic cylinders 22'–25' each is pivotally mounted at its rearward end to braces 48 and the braces 48 are fixed to the fuselage.

Each of the lever arms 35 is fixed to the rods 45 and the pistons 22''–25'' are pivotally mounted to their respective lever arm 35 whereby the extending movement of the pistons pivots the lever arm which pivots the rod 45 which pivots the panels 22–25.

In the modified form of the invention the fuselage also has the same box-like interior 39' as the interior 39', except that the top side 39 has a slot 49 for the stabilizer fin to pass through. The top panel 24' also has slot 37 extending back to the rearward end 50 of panel 24' and the slot terminates at 37' to allow sufficient room for the stabilizing fin 32' to pivot upward a substantial distance.

The hydraulic cylinder 38 of the adjustable vertical stabilizer fin is pivotally mounted at its rearward end 50 to the bottom panel 41 by lugs. The adjustable stabilizer fin is fixed to a sleeve 51 and the sleeve 51 is pivotally mounted on the rod 45 with a ridge 45' on the rod 45 holding the sleeve 51 in place, whereby the actuation of the cylinder 38 moves the piston 38' which is pivotally connected to the fin 32' at the eye connection 34 and thereby pivots the fin upward and downward about the rod 45.

It will be obvious that various changes and departures may be made to the invention without departing from the spirit and scope thereof and accordingly it is not intended that the invention be limited to that specifically described in the specification or illustrated in the drawing but only as set forth in the appended claims.

What is claimed is:

1. An elevator and rudder control device for an aircraft comprising a top and bottom panel and opposing side panels said panels being mounted in 90 degree relation to one another about the tail of an aircraft, said panels being pivotally mounted to said fuselage, said panels when closed conforming at least generally to the contour of the fuselage of the tail of an aircraft, said panels adapted to be individually pivotally opened about their pivotal mounting to change the direction of flight of an aircraft, stabilizing fins mounted to the rear of the fuselage.

2. An elevator and rudder control device according to claim 1 wherein at least several of said panels at the rear of the fuselage each have one of said stabilizing fins mounted thereto.

3. An elevator and rudder control device according to claim 1 wherein one of said stabilizing fins is pivotally mounted to the rear of the fuselage and adapted to be projected and retracted into the fuselage to vary the stabilizing effect of the fins.

References Cited

UNITED STATES PATENTS

| | | | |
|---|---|---|---|
| 2,525,844 | 10/1950 | Weaver | 244—87 XR |
| 2,533,702 | 12/1950 | Weaver | 244—87 |
| 2,691,497 | 10/1954 | Scheide et al. | 114—145 XR |

ANDREW H. FARRELL, *Primary Examiner.*